United States Patent [19]
Tran

[11] Patent Number: 5,941,981
[45] Date of Patent: Aug. 24, 1999

[54] SYSTEM FOR USING A DATA HISTORY TABLE TO SELECT AMONG MULTIPLE DATA PREFETCH ALGORITHMS

[75] Inventor: Thang M. Tran, Austin, Tex.

[73] Assignee: Advanced Micro Devices, Inc., Sunnyvale, Calif.

[21] Appl. No.: 08/963,276

[22] Filed: Nov. 3, 1997

[51] Int. Cl.[6] .................................................. G06F 9/312
[52] U.S. Cl. .......................... 712/207; 711/137; 711/213
[58] Field of Search ................................... 711/137, 204, 711/213; 712/225, 207

[56] References Cited

U.S. PATENT DOCUMENTS

| 5,761,468 | 6/1998 | Emberson | 712/207 |
| 5,790,823 | 8/1998 | Puzak et al. | 712/207 |
| 5,835,967 | 11/1998 | McMahan | 712/207 |

OTHER PUBLICATIONS

Scott McFarling, "Combining Branch Predictors," digital Western Research Laboratory, WRL Technical Note TN–36, Jun. 1993, 25 pages.

Ando, Ki et al., Adaptive Data Prefetching Using Cache Information, ACM, 1997, pp. 204–212.

Chen, Tien–Fu, An Effective Programmable Prefetch Engine for On–Chip Caches, IEEE 1995, pp. 237–242.

Jégou, Y. et al., Speculative Prefetching, ACM, 1993, pp. 57–66.

*Primary Examiner*—Richard L. Ellis
*Attorney, Agent, or Firm*—Conley, Rose & Tayon; Lawrence J. Merkel; B. Noel Kivlin

[57] ABSTRACT

A prefetch unit stores a plurality of prefetch control fields in a data history table. Each prefetch control field selects one of multiple prefetch algorithms for use in prefetching data. As an instruction stream is fetched, the fetch address is provided to the data history table for selecting a prefetch control field. Since multiple prefetch algorithms are supported, many different data reference patterns may be prefetched. The prefetch unit is configured to gauge the effectiveness of the selected prefetch algorithm, and to select a different prefetch algorithm if the selected prefetch algorithm is found to be ineffective. The prefetch unit monitors the load/store memory operations performed in response to the instruction stream (i.e. the non-prefetch memory operations) to determine the effectiveness. Alternatively, the prefetch unit may evaluate each of the prefetch algorithms with respect to the observed set of memory references and select the algorithm which is most accurate.

20 Claims, 5 Drawing Sheets

SYSTEM FOR USING A DATA HISTORY TABLE TO SELECT AMONG MULTIPLE DATA PREFETCH ALGORITHMS

BACKGROUND OF THE INVENTION

1. Field of the Invention

This invention is related to the field of microprocessors and, more particularly, to prefetch mechanisms within microprocessors.

2. Description of the Related Art

Modern microprocessors are demanding increasing memory bandwidth (and particularly decreased memory latency) to support the increased performance achievable by the microprocessors. Increasing clock frequencies (i.e. shortening clock cycles) employed by the microprocessors allow for more data and instructions to be processed per second, thereby increasing bandwidth requirements. Furthermore, modern microprocessor microarchitectures are improving the efficiency at which the microprocessor can process data and instructions. Bandwidth requirements are increased even further due to the improved processing efficiency.

Computer systems typically have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data then may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a low latency system. Microprocessor performance may suffer due to the latency of the memory system.

In order to increase performance, microprocessors may employ prefetching to "guess" which data will be requested in the future by the program being executed. If the guess is correct, the delay of fetching the data from memory has already occurred when the data is requested (i.e. the requested data may be available within the microprocessor). In other words, the effective latency of the data is reduced. The microprocessor may employ a cache, for example, and the data may be prefetched from memory into the cache. The term prefetch, as used herein, refers to transferring data into a microprocessor (or cache memory attached to the microprocessor) prior to a request for the data being generated via execution of an instruction within the microprocessor. Generally, prefetch algorithms (i.e. the methods used to generate prefetch addresses) are based upon the pattern of accesses which have been performed in response to the program being executed. For example, one data prefetch algorithm is the stride-based prefetch algorithm in which the difference between the addresses of consecutive accesses (the "stride") is added to subsequent access addresses to generate a prefetch address. Another type of prefetch algorithm is the stream prefetch algorithm in which consecutive data words (i.e. data words which are contiguous to one another) are fetched.

The type of prefetch algorithm which is most effective for a given set of instructions within a program depends upon the type of memory access pattern exhibited by the set of instructions (or instruction stream). Stride-based prefetch algorithms often work well with regular memory reference patterns (i.e. references separated in memory by a fixed finite amount). An array, for example, may be traversed by reading memory locations which are separated from each other by a regular interval. After just a few memory fetches, the stride-based prefetch algorithm may have learned the regular interval and may correctly predict subsequent memory fetches. On the other hand, the stream prefetch algorithm may work well with memory access patterns in which a set of contiguous data is accessed once and then not returned to for a relatively long period of time. For example, searching a string for a particular character or for comparing to another string may exhibit a stream reference pattern. If the stream can be identified, the data can be prefetched, used once, and discarded. Yet another type of reference pattern is a loop reference pattern, in which data may be accessed a fixed number of times (i.e. the number of times the loop is executed) and then may not be accessed for a relatively long period of time.

None of the prefetch algorithms described above is most effective for all memory access patterns. In order to maximize prefetching and caching efficiency, it is therefore desirable to identify early in a microprocessor pipeline which type of memory access pattern is to be performed by an instruction stream being fetched in order to employ the appropriate prefetch algorithm for that instruction stream. The earlier in the pipeline that the prefetch algorithm may be determined, the earlier the prefetch may be initiated and consequently the lower the effective latency of the accessed data may be.

SUMMARY OF THE INVENTION

The problems outlined above are in large part solved by a prefetch unit in accordance with the present invention. The prefetch unit stores a plurality of prefetch control fields in a data history table. Each prefetch control field selects one of multiple prefetch algorithms for use in prefetching data. As an instruction stream is fetched, the fetch address is provided to the data history table for selecting a prefetch control field. Advantageously, an appropriate prefetch algorithm for the instruction stream being fetched may be selected. Since multiple prefetch algorithms are supported, many different data reference patterns may be successfully prefetched. Different parts of a particular program may exhibit different data reference patterns, and an appropriate prefetch algorithm for each of the reference patterns may be initiated upon execution of the different parts of the program. Effective latency for data accesses may be reduced if the prefetch algorithm successfully prefetches memory operands used by the corresponding instruction stream.

The prefetch unit is configured to gauge the effectiveness of the selected prefetch algorithm, and to select a different prefetch algorithm if the selected prefetch algorithm is found to be ineffective. The prefetch unit monitors the load/store memory operations performed in response to the instruction stream (i.e. the non-prefetch memory operations) to determine the effectiveness. Alternatively, the prefetch unit may evaluate each of the prefetch algorithms with respect to the observed set of memory references and select the algorithm which is most accurate.

Broadly speaking, the present invention contemplates a prefetch unit comprising a data history table coupled to a control unit. Coupled to receive a fetch address, the data history table is configured to store a plurality of data address predictions. Each of the plurality of data address predictions includes a prefetch control field identifying one of a plurality of prefetch algorithms. In response to the fetch address, the data history table is configured to select one of the plurality of data address predictions. Coupled to the data history table, the control unit is configured to initiate the one of the plurality of prefetch algorithms indicated by the prefetch control field within the one of the plurality of data address predictions.

The present invention further contemplates a microprocessor comprising an instruction cache and a prefetch unit. The instruction cache is configured to provide a plurality of instructions for execution in response to a fetch address. Coupled to receive the fetch address concurrent with the instruction cache, the prefetch unit includes a data history table configured to provide a data address prediction in response to the fetch address. The data address prediction includes a prefetch control field, and the prefetch unit is configured to select one of a plurality of prefetch algorithms in response to the prefetch control field. Furthermore, the prefetch unit is configured to initiate prefetching using the one of the plurality of prefetch algorithms.

Moreover, the present invention contemplates a method for prefetching comprising. A plurality of instructions are fetched from an instruction cache. A data history table is accessed to select a selected prefetch algorithm from a plurality of prefetch algorithms using a prefetch control field corresponding to the plurality of instructions. Data is prefetched for use by the plurality of instructions using the selected prefetch algorithm.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
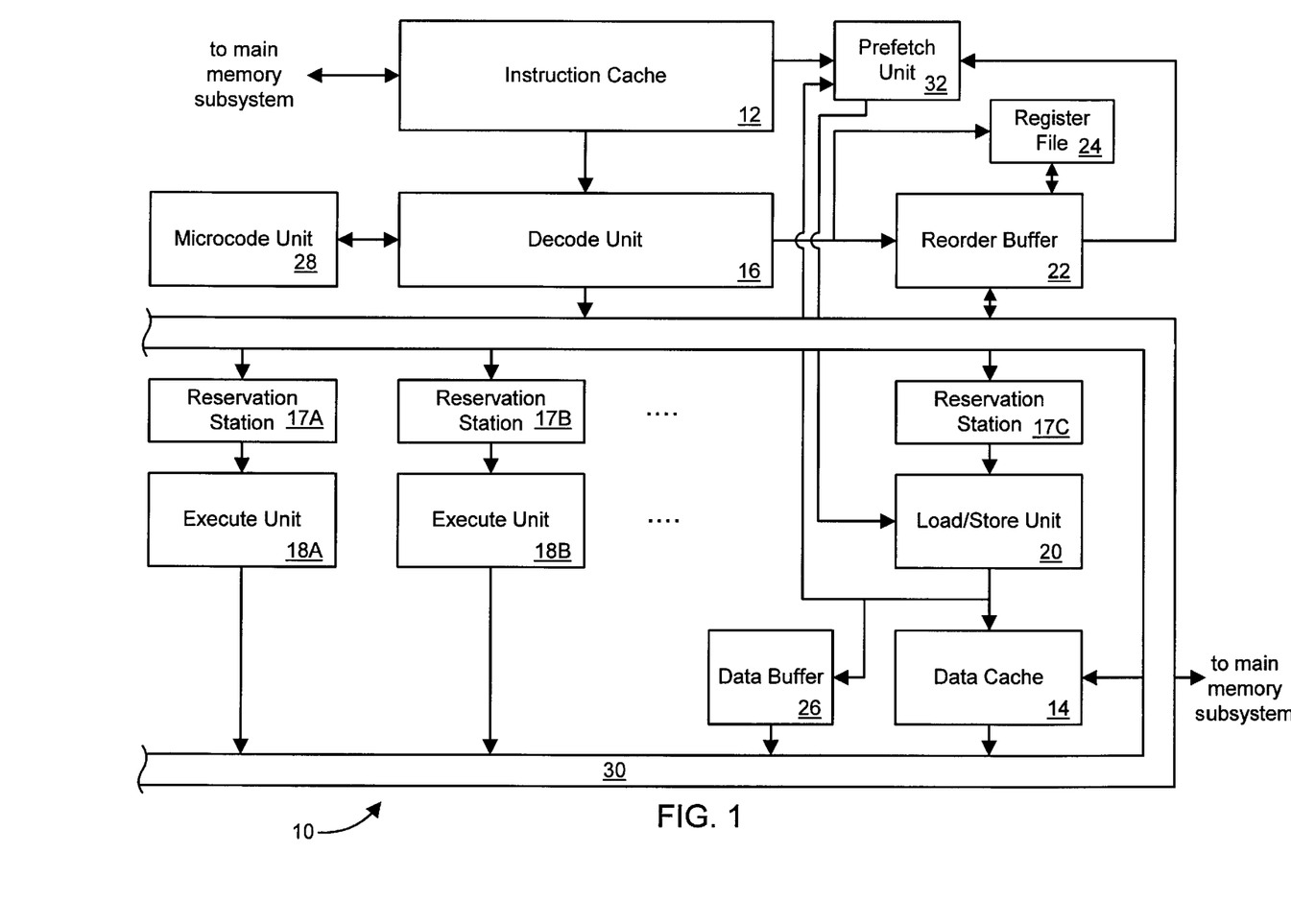
FIG. 1 is a block diagram of one embodiment of a microprocessor including a prefetch unit.

Turning now to FIG. 1, a block diagram of one embodiment of a microprocessor 10 is shown. Other embodiments are possible and contemplated. Microprocessor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a data buffer 26, a microcode unit 28, and a prefetch unit 32. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to a main memory subsystem (not shown) and to a decode unit 16, which is further coupled to reservation stations 17, reorder buffer 22, register file 24, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to both data cache 14 and data buffer 26, which are further coupled to the main memory subsystem. Additionally, prefetch unit 32 is coupled to load/store unit 20, instruction cache 12, and reorder buffer 22.

Generally speaking, prefetch unit 32 includes a data history table which stores a plurality of prefetch control fields. The prefetch control fields are associated with fetch addresses, and select a prefetch algorithm for prefetching when a particular fetch address is presented. In one embodiment, prefetch unit 32 may receive the fetch address concurrently with instruction cache 12. The selected prefetch algorithm is based upon previous execution of the instructions corresponding to the fetch address. Advantageously, an appropriate prefetch algorithm for the instructions being fetched may be selected early in the instruction processing pipeline of the microprocessor. Prefetching may be initiated using the selected prefetch algorithm, thereby allowing for a reduced effective latency for the prefetched memory operands if the prefetched memory operands are used by microprocessor 10.

Prefetch unit 32 may be configured to generate prefetch addresses corresponding to the selected prefetch algorithm and may be further configured to convey the prefetch addresses to load/store unit 20. The data history table may store a predicted data address for use in generating the prefetch addresses according to the selected prefetch algorithm. Load/store unit 20 may be configured to perform load memory operations using the prefetch addresses, in order to determine if the prefetch addresses miss in data cache 14. Misses can cause the data to be read from memory and placed into data cache 14 for later access by memory operations within the instructions corresponding to the fetch address corresponding to the prefetch addresses. Alternatively, if the stream prefetch algorithm is selected, misses in data cache 14 may cause data to be read from memory and placed into data buffer 26.

Prefetch unit 32 may be further configured to monitor data access patterns indicated by the non-prefetch load/store memory operations performed by load/store unit 20. Prefetch unit 32 may thereby generate a selected prefetch algorithm for an instruction stream for which the data history table has no prefetch control field. On the other hand, prefetch unit 32 may evaluate the effectiveness of the selected prefetch algorithm in the case that a prefetch control field corresponding to the instruction stream is stored in the data history table by monitoring the non-prefetch load/store memory operations.

In one embodiment, load/store unit 20 is configured to perform load/store accesses to data cache 14 and data buffer 26 in response to memory operations from reservation station 17C and load accesses in response to prefetch addresses from prefetch unit 32. Load/store unit 20 may prioritize memory operations from reservation station 17C higher than prefetch memory operations corresponding to the prefetch addresses, in order to perform memory operations currently needed by the instructions being executed prior to prefetching.

Data buffer 26 is a relatively small data buffer used for storing stream-type prefetch data. In this manner, data that is predicted to be used only once does not dislodge other data from data cache 14. Advantageously, data cache 14 may be used more efficiently by retaining data which is more likely to be reused. Loop data may be stored in data cache 14, or may be stored in data buffer 26. The loop count may be stored with the data to indicate when the data should be discarded. If the loop data is stored in the data cache, the loop count may be used as an indication of when the loop data is a candidate for replacement.

As used herein, the term "address" refers to a value which identifies one or more bytes of information stored in the main memory. The address may be virtual, in which a translation defines the corresponding physical address actually presented to main memory. A fetch address is an address used to fetch instruction bytes (e.g. from instruction cache 12 or from main memory, in the event of a miss). A data address is an address used to fetch data (e.g. memory operands for instructions). Prefetch unit 32 is generally used for predicting data addresses in the present embodiment.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store (i.e. read/write) memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing. Additionally, microcode unit 28 may perform functions employed by microprocessor 10. For example, microcode unit 28 may perform instructions which represent a context switch. Generally speaking, the "context" of a program comprises the state needed to correctly run that program. Register values created by the program are included in the context, as are the values stored in any memory locations used by the program. Microcode unit 28 causes the context stored within microprocessor 10 to be saved to memory at a predefined memory location (according to the microprocessor architecture employed by microprocessor 10) and restores the context of the program being initiated. Context switches may occur in response to an interrupt being signalled to microprocessor 10, for example.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. Generally speaking, a "memory operation" is performed to transfer data between the main memory and microprocessor 10. A load memory operation specifies the transfer of data from one or more memory locations within the main memory to microprocessor 10. On the other hand, a store memory operation specifies the transfer of data from microprocessor 10 to one or more memory locations within the main memory. The memory location or locations accessed by a given memory operation are identified within the main memory by an address corresponding to the given memory operation.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration. Data cache 14 allocates and deallocates storage for data in cache lines. A cache line is a block of contiguous bytes. The byte within the cache line which has the lowest numerical address is stored at an address which is aligned to a cache line boundary.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location) or data cache 14. Load/store unit 20 performs the memory operations, and an execute unit 18 performs the execution of the instruction.

Figure 2:
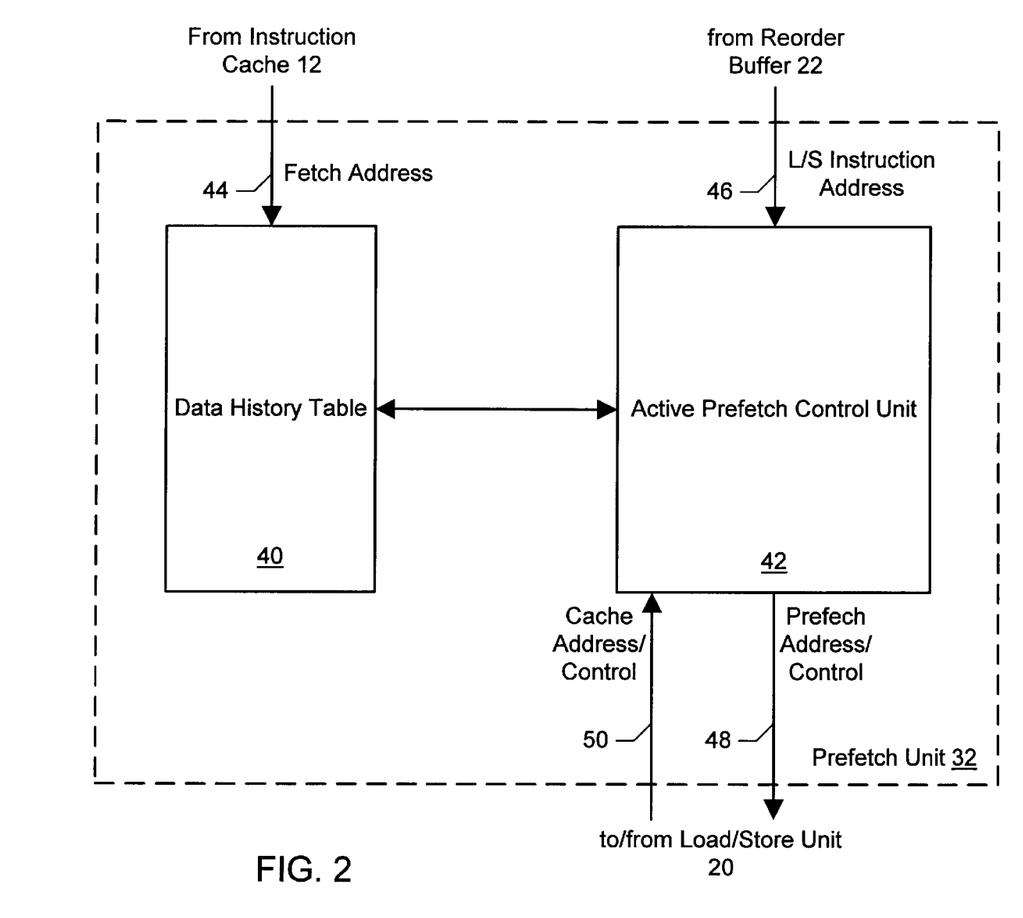
FIG. 2 is a block diagram of one embodiment of the prefetch unit shown in FIG. 1 including a data history table.

Turning next to FIG. 2, a block diagram of one embodiment of prefetch unit 32 is shown. Other embodiments of prefetch unit 32 and the blocks shown in FIG. 2 are possible and contemplated. As shown in FIG. 2, prefetch unit 32 includes a data history table 40 and an active prefetch control unit 42. Data history table 40 is connected to a fetch address bus 44 from instruction cache 12, and is further connected to active prefetch control unit 42. Active prefetch control unit 42 is connected to an L/S instruction address bus 46 from reorder buffer 32, a prefetch address/control bus 48 to load/store unit 20, and a cache address/control bus 50 from load/store unit 20.

Instruction cache 12 conveys a fetch address corresponding to instructions being fetched therefrom during a clock cycle. Responsive to the fetch address, data history table 40 indexes to a storage location storing a data address prediction, and conveys the data address prediction to active prefetch control unit 42. Data history table 40 may include a fetch address tag field in the data address prediction for determining that the data address prediction corresponds to the fetch address (i.e. the fetch address tag field stores the most significant portion of the fetch address which is not used as the index to data history table 40). Data history table 40 may compare the fetch address tag field of the selected data address prediction to the corresponding portion of the fetch address upon fetch address bus 44 to determine if the selected data address prediction corresponds to the fetch address. A hit/miss signal may then be provided to active prefetch control unit 42.

Data history table 40 may be configured in any suitable geometry (e.g. direct mapped, set associative, or fully associative). If a direct mapped table is used, the comparison of the fetch address tag field to the fetch address may be used to determine hit/miss, but the comparison may not be needed to select a data address prediction from data history table 40. On the other hand, set associative or fully associative configurations may use the comparison to select a data address prediction in addition to determining hit/miss status.

Active prefetch control unit 42 is configured to receive the data address prediction from data history table 40. The data address prediction includes a prefetch control field which selects one of multiple prefetch algorithms implemented by active prefetch control unit 42. Active prefetch control unit 42 uses the selected prefetch algorithm to generate prefetch addresses, which are conveyed to load/store unit 20 upon prefetch address/control bus 48. The initial prefetch address may be a predicted data address stored within data history table 40. Subsequent prefetch addresses may then be generated using the selected prefetch algorithm. Additionally, prefetch control unit 42 conveys control information to load/store unit 20. The control information may include, for example, an indication of whether or not the prefetched data is to be stored in data cache 14 or data buffer 26. Other control information may be implemented as desired in various embodiments. For example, if the stream prefetch algorithm is selected, the control information may indicate storage in data buffer 26. On the other hand, if the stride-based prefetch algorithm is selected, the control information may indication storage in data cache 14.

Prior to initiating prefetch in response to a data address prediction, active prefetch unit 42 may first determine whether or not the data address prediction is already being prefetched. For example, during execution of a loop in a program the same instruction stream is fetched multiple times. However, the prefetch algorithm selected is the same during each fetch of the instruction stream. Additionally, depending upon the granularity for which data address predictions are stored, multiple instruction fetches may be required to fetch all the instructions within the instruction stream corresponding to the data address prediction. In other words, a data address prediction may represent the data access pattern of an instruction stream comprising multiple cache lines from instruction cache 12. Active prefetch control unit 42 may therefore initiate a new prefetch when a different data address prediction than the current data address prediction is provided by data history table 40.

If a data history table miss is detected, active prefetch control unit 42 may be configured to monitor the execution of the corresponding instruction stream to generate a data address prediction for storage in data history table 40. Furthermore, even if a data address prediction is detected, active prefetch control unit 42 may be configured to determine the effectiveness of the selected prefetch algorithm. If the selected prefetch algorithm is determined to be ineffective, then the prefetch control field corresponding to the selected prefetch algorithm may be updated to select a different prefetch algorithm. In either case, active prefetch control unit 42 may update data history table 40.

In order to monitor the execution of an instruction stream, active prefetch control unit 42 receives cache address/control bus 50 from load/store unit 20. Cache address/control bus 50 comprises at least a subset of the information transmitted by load/store unit 20 to data cache 14 in order to perform a cache access. Certain information transmitted to data cache 14 may not be useful to active prefetch control unit 42 and may be omitted from cache address/control bus 50. Additionally, reorder buffer 22 provides the instruction address corresponding to the memory operation represented upon cache address/control bus 50 via L/S instruction address bus 46. Reorder buffer 22 receives the result tag corresponding to the memory operation being performed from load/store unit 20 (via result buses 30), and may therefore convey the corresponding instruction address to active prefetch control unit 42.

Active prefetch control unit 42 may store the instruction fetch address corresponding to the active prefetch to determine which load/store instruction addresses as provided upon instruction address bus 46 correspond to instructions within the active prefetch. Additionally, active prefetch control unit 42 may further be configured to retain a number of previous data address predictions (i.e. prior to the active prefetch) in order to monitor the effectiveness of the selected prefetch algorithm for each data address prediction. After determining the effectiveness, active prefetch control unit 42 may update data history table 40.

As an alternative to monitoring load/store unit 20 to create a data address prediction when a miss in data history table 40 is detected, active prefetch control unit 42 may generate a default selected prefetch algorithm and update data history table 40 to indicate the default selected prefetch algorithm. The default selected prefetch algorithm may depend upon such factors as data address, instruction opcode, and software hints.

In one embodiment, the prefetch algorithms supported by prefetch unit 32 (and hence the prefetch algorithms selected from via the prefetch control field of each data address prediction) include a stride-based algorithm, a stream algorithm, a loop algorithm, and a no prefetch algorithm. Stride-based and stream algorithms were described above. The loop algorithm may use either the stride-based or stream algorithm to generate prefetch addresses, but the loop algorithm also adds the loop count to the control information provided upon prefetch address/control bus 48. In this manner, data buffer 26 or data cache 14 may record the number of expected accesses to a particular prefetched datum. Data cache 14 or data buffer 26 may attempt to retain the datum until the number of references have occurred and then discard the datum. No prefetch algorithm may be selected if none of the available prefetch algorithms are effective at predicting the data addresses generated by the instruction stream.

Figure 3:
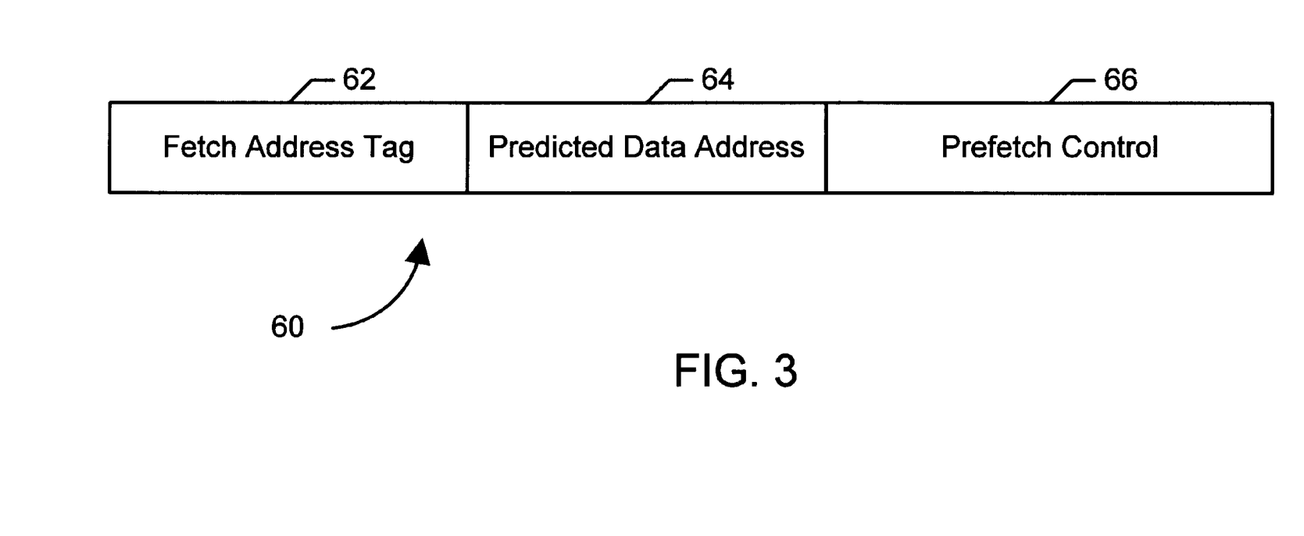
FIG. 3 is a diagram of one embodiment of an entry from one embodiment of the data history table shown in FIG. 2.

Turning now to FIG. 3, an exemplary data address prediction 60 as may be employed by one embodiment of data history table 40 is shown. Other embodiments are possible and contemplated. As shown in FIG. 3, data address prediction 60 includes a fetch address tag field 62, a predicted data address field 64, and a prefetch control field 66. Fetch address tag field 62 stores the fetch address tag for which data address prediction 60 is storing data address prediction information. Additionally, predicted data address field 64 stores a predicted data address which may be used to generate prefetch addresses. The predicted data address may correspond to an address generated during a previous execution of the corresponding instruction stream. Finally, prefetch control field 66 is the prefetch control information used to select one of the prefetch algorithms employed by prefetch unit 32.

It is noted that, in another embodiment, predicted data address field 64 may be eliminated. The data address generated via execution of the corresponding instructions may be used to generate prefetch addresses. The generated prefetch addresses are predicted to be used by the instruction stream being executed, given the first address generated by the instruction stream. Still further, fetch address tag field 62 may be eliminated in other embodiments. Such embodiments assume the prefetch control field 66 selected in response to a fetch address corresponds to the fetch address and updates the prefetch control field 66 upon monitoring the results of the selected prefetch algorithm.

Figure 4:
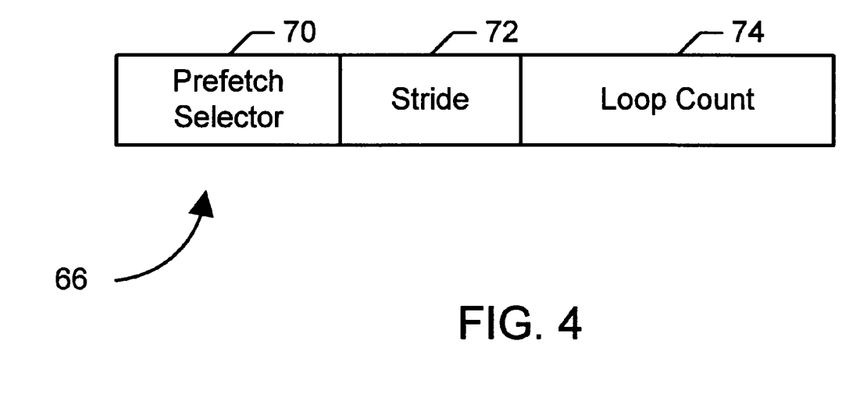
FIG. 4 is a diagram of one embodiment of a prefetch control field illustrated in FIG. 3.

Turning next to FIG. 4, a block diagram of one embodiment of prefetch control field 66 is shown. As shown in FIG. 4, prefetch control field 66 includes a prefetch selector field 70, a stride field 72, and a loop count field 74. Other embodiments are possible and contemplated.

Prefetch selector field 70 identifies one of the prefetch algorithms employed by prefetch unit 32. In one embodiment, prefetch selector field 70 comprises a saturating counter and a value selecting one of the prefetch algorithms. The saturating counter is incremented each time the selected prefetch algorithm is determined to be effective and is decremented each time the selected prefetch algorithm is determined to be ineffective. The saturating counter saturates at a maximum value and a minimum value. The minimum value indicates incorrect, and subsequent values indicate various levels of weakly correct until the maximum value which indicates strongly correct. For example, a two bit counter may be employed with a maximum value of '11' (binary) and a minimum value of '01' binary. The value '11' indicates strongly correct; the value '10' indicates weakly correct; and the value '01' indicates incorrect. When a value of '01' is reached, the selected prefetch algorithm is switched to a different prefetch algorithm.

A different prefetch algorithm may be selected in a variety of ways. The value selecting the prefetch algorithm within prefetch selector 70 may be incremented (encoded value) or shifted (one-hot value) to select another prefetch algorithm. Alternatively, each of the prefetch algorithms may be evaluated and the most correct one selected.

As opposed to maintaining the saturating counter, each of the prefetch algorithms may be evaluated each time the data address prediction 60 including prefetch control field 66 is fetched. The most correct algorithm may then be save for subsequent use. It is noted that the effectiveness of a prefetch algorithm may be determined by comparing the addresses generated in response to the prefetch algorithm to the addresses generated by executing the corresponding instructions.

Stride field 72 is used to store the stride used for the stride-based prefetch algorithm. Similarly, loop count field 74 is used to store a loop count for the loop prefetch algorithm.

Figure 5:
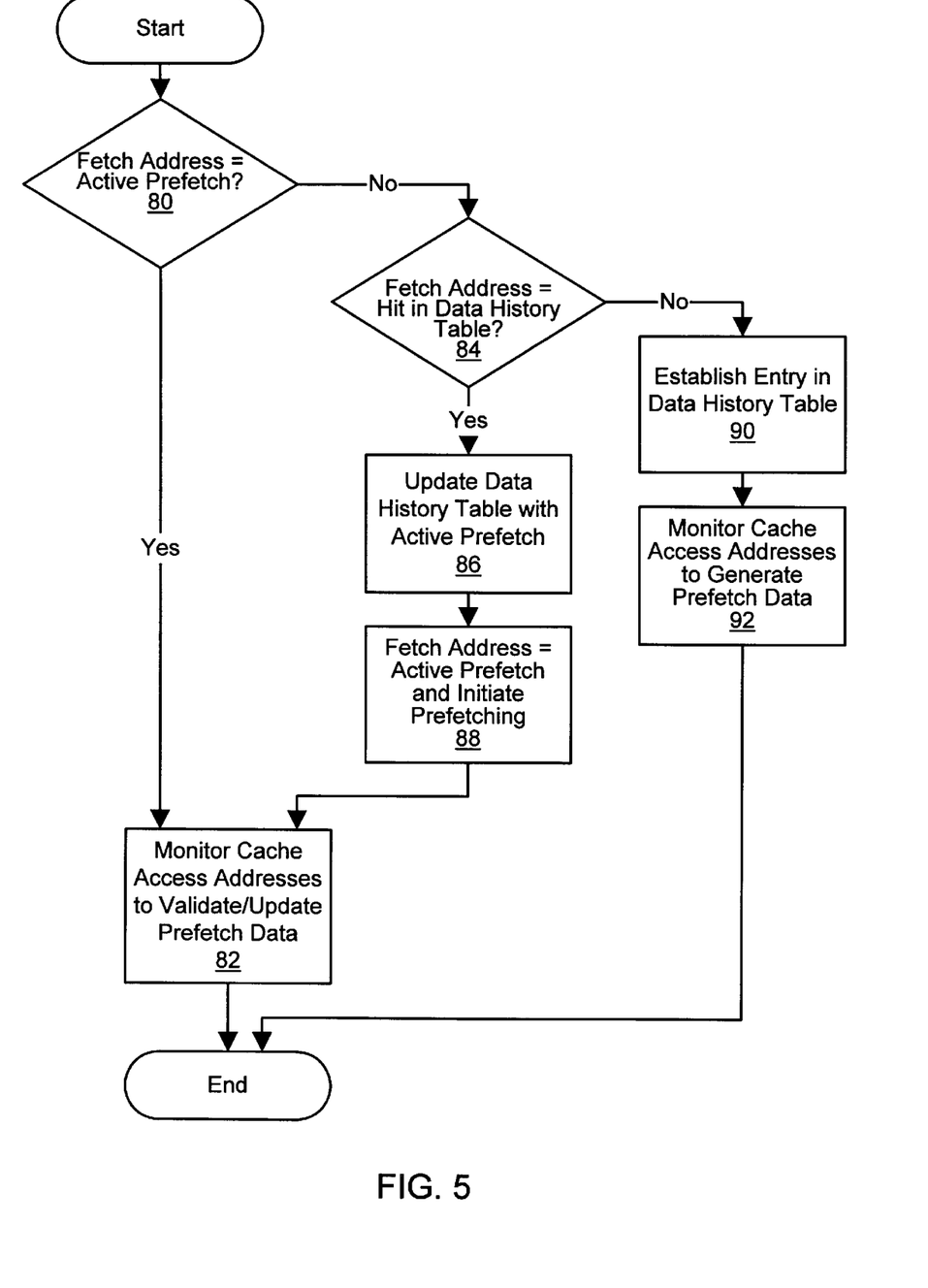
FIG. 5 is a flowchart illustrating operation of one embodiment of an active prefetch control unit shown in FIG. 2.

Turning now to FIG. 5, a flowchart is shown illustrating operation of one embodiment of active prefetch control unit 42 is shown. Other embodiments are possible and contemplated.

Active prefetch control unit 42 determines if the fetch address provided by instruction cache 12 during the clock cycle corresponds to the active prefetch (decision block 80). For example, active prefetch control unit 42 may compare the data address prediction selected by the fetch address to the active data address prediction (i.e. the data address prediction corresponding to the fetch address is the same as the data address prediction being used for current prefetching). If the fetch address corresponds to the active prefetch, active prefetch control unit 42 continues prefetching using the active prefetch and continues monitoring the cache access addresses from load/store unit 20 to determine if the selected prefetch algorithm corresponding to the active prefetch is effective (step 82).

On the other hand, if the fetch address does not correspond to the active prefetch, active prefetch control unit 42 determines if the fetch address is a hit in data history table 40 (decision block 84). If the fetch address is a hit in data history table 40, active prefetch control unit 42 updates data history table 40 according to the effectiveness of the active prefetch (step 86). The data address prediction corresponding to the fetch address is then made the active prefetch and prefetch is initiated (step 88). Subsequently, the cache access addresses are monitored to validate and/or update the data address prediction (step 82).

If the fetch address is a miss in data history table 40, then active prefetch control unit 42 establishes an entry in the data history table (step 90). Subsequently, active prefetch control unit 42 monitors the cache accesses to generate the data address prediction for the entry (step 92).

Figure 6:
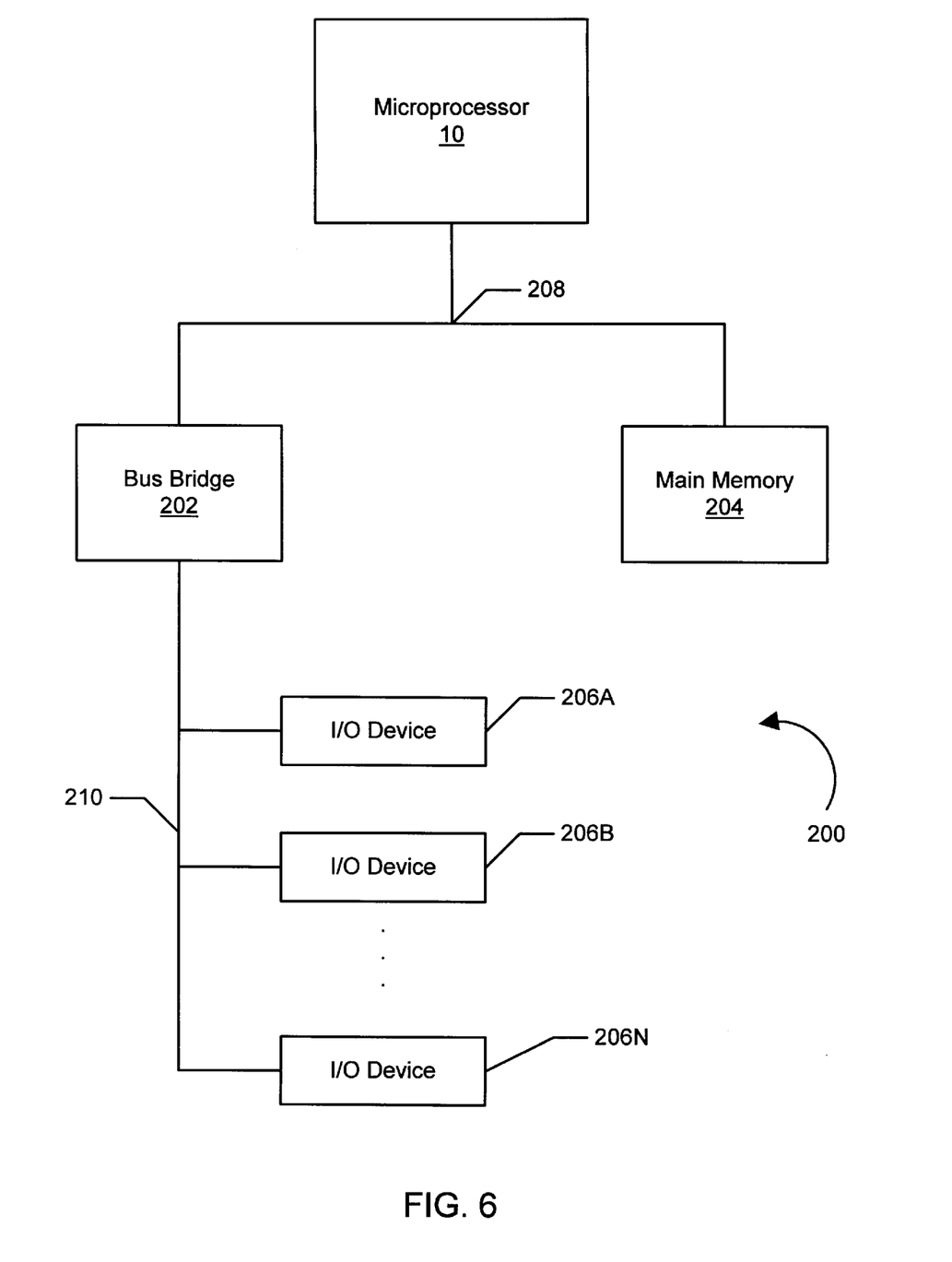
FIG. 6 is a block diagram of one embodiment of a computer system including the microprocessor shown in FIG. 1.

Turning now to FIG. 6, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 6 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

In accordance with the above disclosure, a microprocessor has been described which employs a prefetch unit. The prefetch unit supports multiple prefetch algorithms, and one of the prefetch algorithms is selected based upon the fetch address of the instructions being fetched. Advantageously, a prefetch algorithm appropriate for a particular instruction stream may be selected.

Numerous variations and modifications will become apparent to those skilled in the art once the above disclosure is fully appreciated. It is intended that the following claims be interpreted to embrace all such variations and modifications.

What is claimed is:

1. A prefetch unit comprising:
    a data history table coupled to receive a fetch address, wherein said data history table is configured to store a plurality of data address predictions, and wherein each of said plurality of data address predictions includes a prefetch control field identifying one of a plurality of prefetch algorithms, and wherein said data history table is configured to select one of said plurality of data address predictions in response to said fetch address; and
    a control unit coupled to said data history table, wherein said control unit is configured to initiate said one of said plurality of prefetch algorithms indicated by said prefetch control field within said one of said plurality of data address predictions.

2. The prefetch unit as recited in claim 1 wherein said control unit is configured to initiate said one of said plurality of prefetch algorithms using a predicted data address included within said one of said plurality of data address predictions.

3. The prefetch unit as recited in claim 2 wherein said control unit is configured to generated a first prefetch address and a second prefetch address according to said one of said plurality of prefetch algorithms.

4. The prefetch unit as recited in claim 3 wherein said first prefetch address comprises said predicted data address.

5. The prefetch unit as recited in claim 3 wherein said control unit is configured to convey said first prefetch address and said second prefetch address to a load/store unit for access to a data cache.

6. The prefetch unit as recited in claim 5 wherein said control unit is configured to monitor accesses by said load/store unit to determine a effectiveness of said one of said plurality of prefetch algorithms.

7. The prefetch unit as recited in claim 6 wherein said control unit is configured to determine said effectiveness by evaluating each one of said plurality of prefetch algorithms and selecting which one of said plurality of prefetch algorithms is most accurate.

8. The prefetch unit as recited in claim 6 wherein said control unit is configured to determine said effectiveness by evaluating said one of said plurality of prefetch algorithms and switching to another one of said plurality of prefetch algorithms upon detecting a lack of said effectiveness.

9. The prefetch unit as recited in claim 8 wherein said prefetch control field includes a prediction counter which is incremented upon said one of said prefetch algorithms being effective and decremented upon said one of said prefetch algorithms being ineffective, and wherein said switching is performed upon said prediction counter reaching a predetermined minimum value.

10. The prefetch unit as recited in claim 1 wherein said data history table is coupled to receive said fetch address concurrent with an instruction cache.

11. The prefetch unit as recited in claim 1 wherein said plurality of prefetch algorithms includes a stride-based prefetch algorithm.

12. The prefetch unit as recited in claim 11 wherein said plurality of prefetch algorithms further includes a stream prefetch algorithm.

13. A microprocessor comprising:
an instruction cache configured to provide a plurality of instructions for execution in response to a fetch address; and
a prefetch unit coupled to receive said fetch address concurrent with said instruction cache, wherein said prefetch unit includes a data history table configured to provide a data address prediction in response to said fetch address, and wherein said data address prediction includes a prefetch control field, and wherein said prefetch unit is configured to select one of a plurality of prefetch algorithms in response to said prefetch control field and to initiate prefetching using said one of said plurality of prefetch algorithms.

14. The microprocessor as recited in claim 13 further comprising a load/store unit coupled to said prefetch unit, wherein said prefetch unit is configured to generate a first prefetch address and a second prefetch address and to convey said first prefetch address and said second prefetch address to said load/store unit.

15. The microprocessor as recited in claim 14 wherein said first prefetch address comprises a predicted data address included within said data address prediction.

16. The microprocessor as recited in claim 15 wherein said second prefetch address is generated according to said one of said plurality of prefetch algorithms.

17. The microprocessor as recited in claim 14 further comprising a data cache coupled to said load/store unit, wherein said load/store unit is configured to access said data cache in response to said first prefetch address and said second prefetch address.

18. The microprocessor as recited in claim 17 wherein said load/store unit is further configured to access said data cache in response to a memory operation corresponding to an instruction.

19. The microprocessor as recited in claim 18 wherein said memory operation is performed at a higher priority than said first prefetch address and said second prefetch address.

20. A method for prefetching comprising:
fetching a plurality of instructions from an instruction cache;
accessing a data history table to select a selected prefetch algorithm from a plurality of prefetch algorithms using a prefetch control field corresponding to said plurality of instructions; and
prefetching data for use by said plurality of instructions using said selected prefetch algorithm.

* * * * *